United States Patent [19]
Rist

[11] 3,779,350
[45] Dec. 18, 1973

[54] FREE-WHEEL MECHANISMS AND FREE WHEELS INCORPORATING SUCH MECHANISMS

[75] Inventor: Michel Theophile Rist, Boulogne, France

[73] Assignee: Societe Anonyme Francaise Du Ferodo, Paris, France

[22] Filed: July 26, 1972

[21] Appl. No.: 275,271

[30] Foreign Application Priority Data
July 27, 1971 France .............................. 7127411

[52] U.S. Cl. .................................... 192/45, 192/35
[51] Int. Cl. ............................................. F16d 15/00
[58] Field of Search .................. 192/35, 45; 188/82, 188/84

[56] References Cited
UNITED STATES PATENTS
2,532,670  12/1950  LaBrie ............................. 192/45 X
3,011,606  12/1961  Ferris et al. ......................... 192/45
3,537,555  11/1970  Reister et al. ....................... 192/45

Primary Examiner—Allan D. Herrmann
Attorney—Irvin S. Thompson et al.

[57] ABSTRACT

The invention relates to improved free-wheel mechanisms adapted to couple together or to disconnect two members capable of relative rotation. The free-wheel mechanism is intended to co-operate with inner and outer circular tracks, one of said tracks having ramp means and the other of said tracks having a plain surface, comprising a plurality of jamming members and a cage therefor, said cage comprising two parts, a first part having a plurality of circumferentially spaced windows for receiving the jamming members, and a second part having a plurality of depressions received in said windows and portions folded over said first part for limiting at least relative radial movement of said parts, the bottom end of at least one of said depressions providing a friction surface for cooperation with said plain track surface.

The free-wheel mechanisms find advantageous applications in vehicle transmission systems, for example in hydraulic torque converters.

6 Claims, 4 Drawing Figures

FREE-WHEEL MECHANISMS AND FREE WHEELS INCORPORATING SUCH MECHANISMS

The present invention relates to a free-wheel mechanism adapted to couple together or release two members which are capable of rotating with respect to each other as a function of the relative direction of rotation.

Generally speaking, the mechanisms at present known do not comply with two essential conditions which are: easy and rapid assembly and a low production cost with reliable operation.

In fact, free-wheel mechanisms are known in which the assembly of the various constituent elements is easy and can thus be carried out rapidly. Unfortunately, mechanisms of this type have a very high production cost, particularly due to complicated tooling and machining of the various parts.

Conversely, free-wheel mechanisms are known, in which the production cost is low due to the simplicity of construction of the various parts, but in which the assembly offers considerable difficulty which cancels-out the above-mentioned advantages.

The present invention has for its object to remedy these disadvantages and provides a free-wheel mechanism which has a good resistance to wear, a high capacity of torque transmission with a small overall size, while at the same time the mechanism is of simple design and easy construction, and has therefore a low production cost.

According to the invention, the free-wheel mechanism is intended to co-operate with with inner and outer circular tracks, one of said tracks having ramp means and the other of said tracks having a plain surface, comprising a plurality of jamming members and a cage therefor, said cage comprising two parts, a first part having a plurality of circumferentially spaced windows for receiving the jamming members, and a second part having a plurality of depressions received in said windows and portions folded over said first part for limiting at least relative radial movement of said parts, the bottom end of at least one of said depressions providing a friction surface for cooperation with said plain track surface.

According to an alternative form of embodiment of the invention, the assembly cage is constituted by a circular member comprising windows, and at least one friction unit fixed to the member with windows by means of folded back legs, adapted to limit its movement with respect to the part with windows, at least in a radial direction.

In this manner, the cage forms a retaining means during handling and assembly. It has been found that a cage of this kind also permits, during the course of assembly between one track and the other, of a synchronization of the jamming members which facilitates this assembly.

In a preferred form of construction, the jamming members are rollers and the dimensions of the windows are such that their circumferential respective development has a smaller chord than the diameter of the roller.

The assembly cage may be employed in the synchronization of the jamming members during the operation of the free wheel, this arrangement thus leading to an alternative form in which the elastic means act on the jamming members through the intermediary of the said assembly cage. This arrangement permits the use of elastic means of greater length, which facilitates the choice of the said elastic means which may then be of moderate stiffness, since, as is well known, they must respect the following compromise:

a. They must apply sufficient force to the jamming members so as to facilitate the jamming action;

b. They should not apply excessive force so as not to interfere with their release to a position of non-contact with the track which is rotating with respect to them.

In such a case, when the elastic means are once mounted, they will be supported against one of the said tracks.

These arrangements further permit the production of pre-assembled free-wheel mechanisms which may readily be kept in stock and can be utilized immediately.

The invention has also for its object a free wheel equipped with a mechanism such as that indicated in the foregoing description.

Other characteristic features and advantages of the invention will furthermore be brought out in the description which follows below, given solely by way of example, reference being made to the accompanying drawings, in which.

Figure 1:
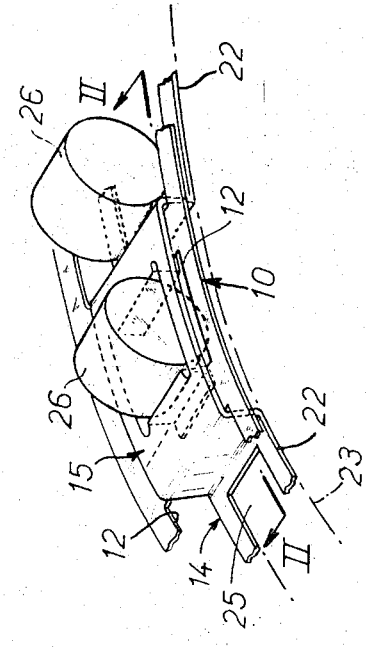
FIG.1 is a partial perspective view of an assembly cage of a free-wheel mechanism in accordance with the invention, the inner and outer tracks not having been shown.
Figure 2:
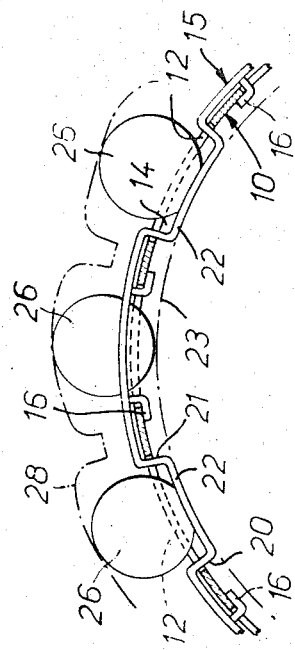
FIG.2 is a cross-section taken along the line II—II of FIG.1.

In the form of construction illustrated in FIGS.1 and 2, the free-wheel mechanism according to the invention comprises an assembly cage including a first part 10 having a plurality of windows 12 intended to receive the depressions 14 of a second part 15 mounted concentrically to the first part and fixed to this latter at 16. These depressions are formed by two small sides 20, 21, orientated radially, and a segment 22, the outer face of which is provided with a curvature similar to that of an inner track 23, shown in this case in chain-dotted lines. These segments 22 thus form friction members.

In each of the segments 22 there is formed a window 25 in order to permit a roller 26 to come into contact with the cylindrical surface of the inner track 23.

In an arrangement of this kind, the bringing into the active position of the jamming members 26 which effect the rigid association of the inner track 23 with the outer track 28, shown in chain-dotted lines in FIG. 2, is effected when the inner track 23 rotates in the jamming direction, by the friction of the segments 22 on the said inner track 23 which drives the assembly cage, the latter acting by the internal edges of its windows to urge the rollers 26 into the jamming position. It should be observed that in this case the cage plays the part of a synchronizing cage, and this furthermore will be the case in the alternative form described below.

Figure 3:
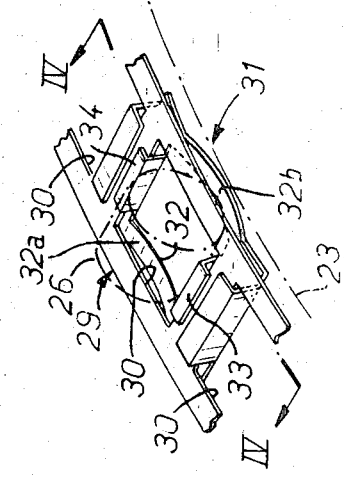
FIG.3 is a view similar to that of FIG.1, showing an alternative form of construction.
Figure 4:
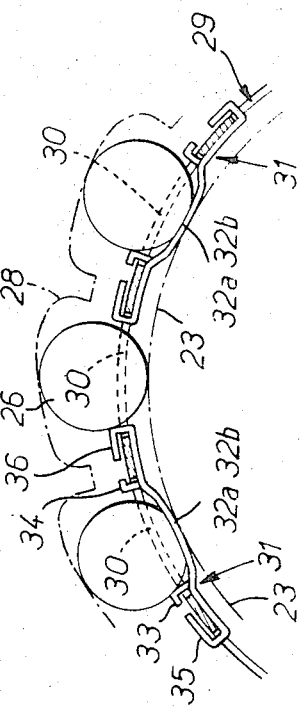
FIG.4 is a view in cross-section taken along the line IV—IV of FIG.3.
Figure 4:
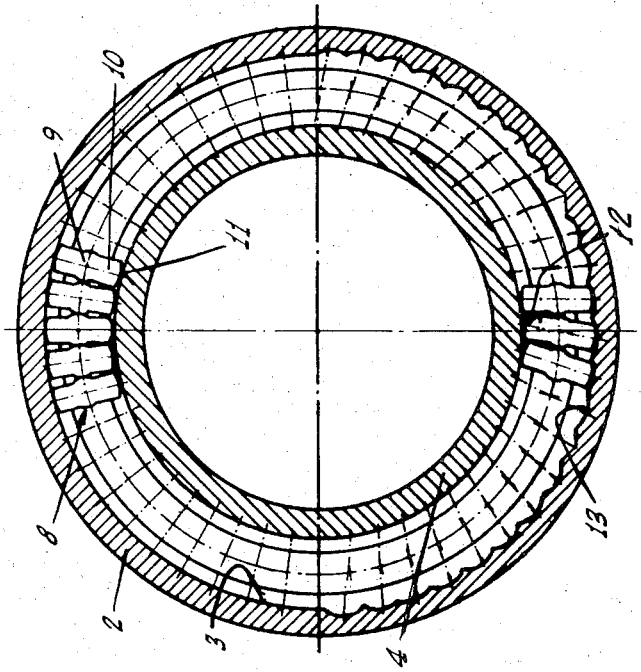
Figure 3:
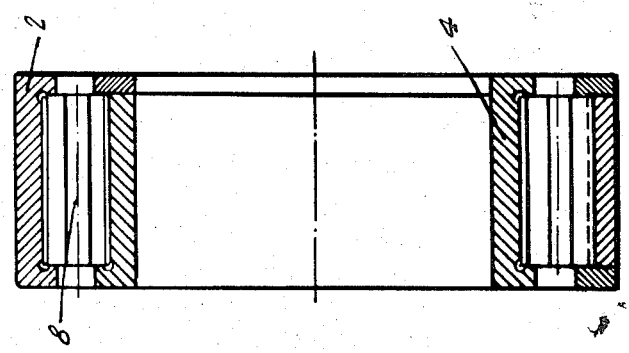
Figure 6:
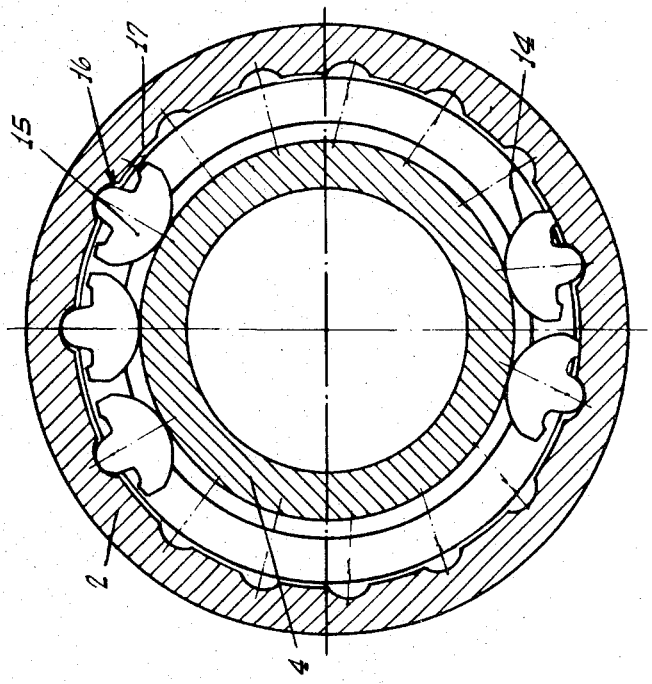
Figure 5:
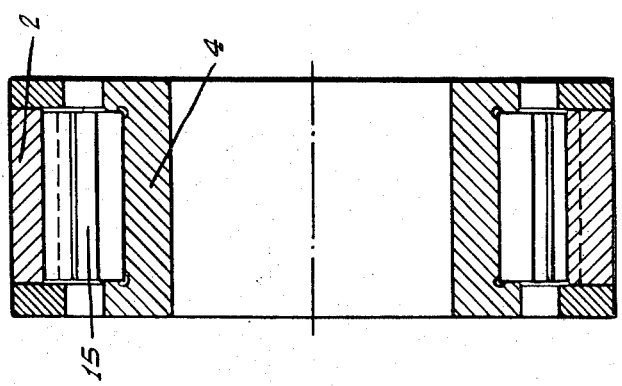

In the alternative form of construction illustrated in FIGS.3 and 4, the assembly cage is constituted by a circular member 29 provided with a series of windows 30 and friction units shown generally at 31, fixed on the said part. The above-mentioned friction units are punched out of steel sheet and they each have a generally rectangular shape with an incurved central zone. These friction units are intended to co-operate in friction with the circular track 23.

In the incurved zone is formed a window 32 of rectangular shape which thus forms two friction shoes 32a, 32b, this window being adapted to permit the movement of a roller 26 and the contact of this roller with the inner track 23.

In the immediate vicinity of the axial sides of the window 32 are formed folded-back members 33, 34 directed towards the outer track 28 and folded-back members 35, 36 directed, like those preceding, towards the outer track 28. The folded-back members 33, 34 and 35, 36 are arranged so as to constitute means for fixing the friction members 31 to the first part 30. The abovementioned fixing means are located on each side of the window 32 of the friction members.

As in the previous form of construction, the friction of the friction shoes 32a, 32b on the inner circular track 23 drives the assembly cage which acts on the inner edges of its windows 30 to drive the rollers 26 into the jammed position against the outer track 28.

In the cases considered, provision is made for associating with the previously-mounted mechanism any appropriate retention means for completing the effect of the cage so as to obtain a pre-assembled unit. A means of this kind may advantageously consist of associating with the pre-assembled mechanism, one of the two tracks, and in particular the track with ramps.

Free wheels comprising a mechanism according to the invention may find numerous applications. They may advantageously be utilized in industrial uses, for vehicles, especially as a constituent member of the transmission, for example in a hydraulic torque converter, etc.

It will of course be understood that the invention is not limited to the forms of embodiment selected and shown, given solely by way of examples, but is on the contrary capable of assuming alternative forms without thereby departing from the scope of the invention.

What I claim is:

1. A free wheel mechanism adapted to cooperate with inner and outer circular tracks, one of said tracks having ramp means and the other of said tracks having a plain surface, comprising a plurality of jamming members and a cage therefor, said cage comprising two parts, a first part having a plurality of circumferentially spaced windows for receiving the jamming members, and a second part having a plurality of depressions received in said windows and portions folded over said first part for limiting at least relative radial movement of said parts, the bottom end of at least one of said depressions providing a friction surface for cooperation with said plain track surface.

2. A free wheel mechanism according to claim 1, wherein the curvature of said friction surface is complementary to the curvature of said plain track surface.

3. A free wheel mechanism as claimed in claim 2, wherein said inner track has said plain track surface and said outer track has said ramp means, the jamming members being cylinders.

4. A free wheel mechanism according to claim 1, wherein the second part includes a plurality of elevated portions alternating with said depression, said elevated portions and depression being arcuate, and radially disposed portions connecting the elevated portions with the depression.

5. A free wheel mechanism according to claim 4, wherein windows are provided in both the elevated portions and the depression for the passage of the jamming members therethrough.

6. A free wheel mechanism according to claim 1, wherein the bottom ends of all the depressions provide friction surfaces of rectangular shape in plan, the central zone of the said friction surfaces being concave facing the plain track surface with which they cooperate.

* * * * *